United States Patent
Kohayakawa

[11] 3,994,573
[45] Nov. 30, 1976

[54] HIGH APERTURE CATOPTRIC SYSTEM

[75] Inventors: Yoshimi Kohayakawa, Yokohama; Kunio Takesi, Tokyo, both of Japan

[73] Assignee: Canon Kabushiki Kaisha, Japan

[22] Filed: Feb. 18, 1975

[21] Appl. No.: 550,742

[30] Foreign Application Priority Data
Feb. 26, 1974 Japan.............................. 49-22614

[52] U.S. Cl. .............................................. 350/201
[51] Int. Cl.² ........................................ G02B 17/02
[58] Field of Search............................ 350/199, 201

[56] References Cited
UNITED STATES PATENTS
2,739,257  3/1956  Sheldon ...................... 350/199 X
3,191,497  6/1965  Matsui ............................ 350/199

FOREIGN PATENTS OR APPLICATIONS
709,243  7/1941  Germany ......................... 350/201

Primary Examiner—Paul A. Sacher
Attorney, Agent, or Firm—McGlew and Tuttle

[57] ABSTRACT

A catoptric system adapted for X-ray fluoroscopic photography comprises a spherical concave reflector disposed to reflect fluorescence light coming from the object plane to a field flattener of positive power positioned in front of a photographic film. In one embodiment of the invention, the reflector is constituted by a negative meniscus lens having a primary surface facing the object plane and with the secondary surface being mirrored. In order to facilitate minimization of the reflector diameter, there is provided a positive meniscus lens, having a concave surface facing the object plane, positioned between the reflector and field flattener to thereby assist in converging the rays of light from the object plane before impingement on the reflector.

4 Claims, 4 Drawing Figures

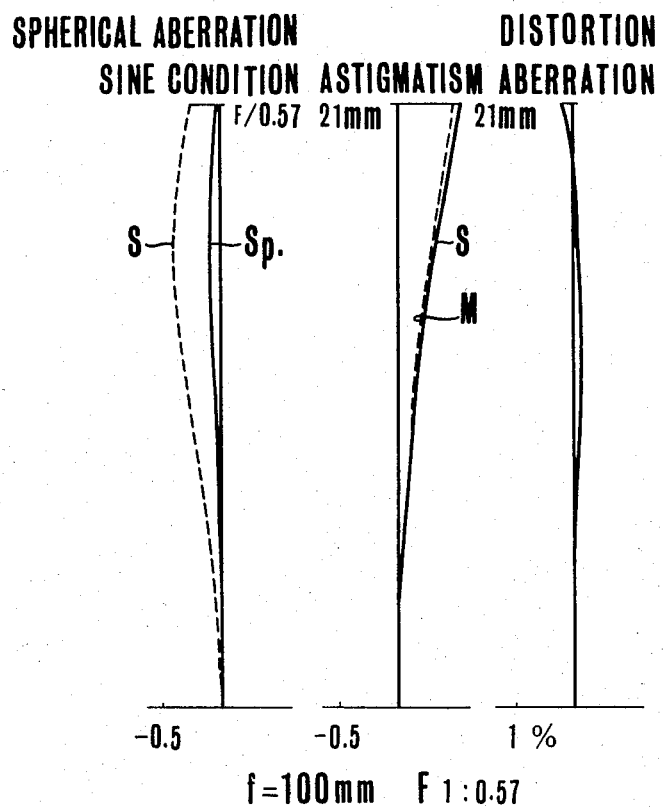

HIGH APERTURE CATOPTRIC SYSTEM

BACKGROUND OF THE INVENTION

This invention relates to catoptric systems, and more particularly to an objective lens system requiring a large relative aperture ratio such as that employed in cameras for X-ray fluoroscopic photography.

A typical example of the prior art objective lens system of the character described is disclosed in Japanese patent No. 39-26447, and is illustrated in FIG. 1. This catoptric objective lens system may be considered as comprising three components of different function, including a first component, counting from the side of the longer conjugate, which is composed of a positive meniscus lens element $I_1$ and a negative meniscus lens element $I_2$ spaced apart from each other and contributes a weak diverging power to the complete system, a second component, which functions only as a reflecting means, and a third component, which includes a negative lens element but contributes a converging power to the complete system. The aberrations, such as spherical aberrations and coma of the complete system, other than the curvature of the image field resulting from the use of the mirror II are corrected by a suitable design of the first component I, and the curvature of the image field is compensated for by a suitable design of the third component III. In order to compensate for the spherical aberrations resulting from the use of the mirror II, a divergent lens component must be selected for employment as the first component I with sacrifice of minimization of the mirror diameter.

On the other hand, from the point of view of facilitating aberrational correction, the basic structure of the prior art high aperture catoptric objective lens system is disadvantageous in effecting sufficiently well correction for outward coma aberration resulting from the use of the mirror, because the positive meniscus lens element I, which serves to correct the coma aberration, and the negative meniscus lens element $I_2$, which serves to correct the spherical aberrations, are arranged in closely spaced relation to each other in the first component I to thereby produce an adverse effect on the correction for the outward coma aberration.

SUMMARY OF THE INVENTION

The present invention has for its object to provide a high aperture catoptric objective lens system which is well corrected for various aberrations including outward coma by employing a convergent lens as the first component, which would otherwise be divergent in the prior art system, and a mangin mirror as the reflecting means, while still minimizing the diameter of the mangin mirror.

BRIEF DESCRIPTION OF THE DRAWINGS

FIG. 4 shows graphic representations of aberrational correction attained for spherical aberration, astigmatism and distortion, respectively, of the system of FIG. 3.

DESCRIPTION OF THE PREFERRED EMBODIMENT

Figure 2:
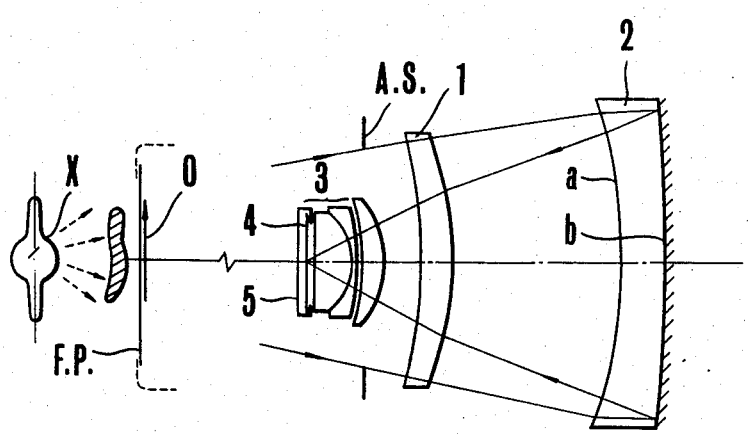
FIG. 2 is a schematic sectional view illustrating the basic structure of the catoptric objective lens system according to one embodiment of the invention.

Referring now to FIG. 2, a schematic example of the catoptric system according to one embodiment of the present invention is illustrated as applied to an objective lens of a camera for X-ray fluoroscopic photography, where the X-ray tube is designated by X, and the fluorescent plate is designated at F.P., on which is formed a real image of fluorescence X-rays and which acts as an object for the catoptric system. The catoptric objective lens system comprises three serially arranged coaxial and axially spaced components including, in the direction of light rays entering the system from the side of the longer conjugate toward the side of the shorter conjugate, a convergent lens component 1 in the form of a positive meniscus lens element having a concave surface facing the object, a concave mangin mirror 2 constituted by a negative meniscus lens element of which the refracting surface, $a$, nearer to the object has a larger radius of curvature than the reflecting surface, $b$, farther from the object, and a field flattener convergent lens component 3 consisting of at least three lens elements, at least one of which is divergent. It is to be noted that all of the refracting and reflecting surfaces except the rearmost surfaces of the image flattener lens component 3 are concave toward the object. An aperture stop of the system is indicated at A.S., and a photographic film is indicated at 4 as mounted in a film case 5.

In order to facilitate the correction of various aberrations and particularly coma which limit the performance of the complete system, the equivalent focal length $F_1$ of the convergent lens component 1 in terms of the equivalent focal length, $f$, of the complete system may lie in the range as defined by $$3.5f \leq F_1 \leq 4f \tag{1}$$

In view of correction of spherical aberrations, the equivalent focal length $F_2$ of the mangin mirror 2 may lie in the range as defined by $$1.2f \leq F_2 \leq 1.6f \tag{2}$$

The field flattener lens component 3 is provided for compensating the curvature of the image field introduced by the mangin mirror 2. In this respect, the equivalent focal length $F_3$ of the component 3 may be in the order of the equivalent focal length of the conventional image flattener, but may be preferably in the range as defined by $$0 < F_3 \leq 2f \tag{3}$$

Figure 1:
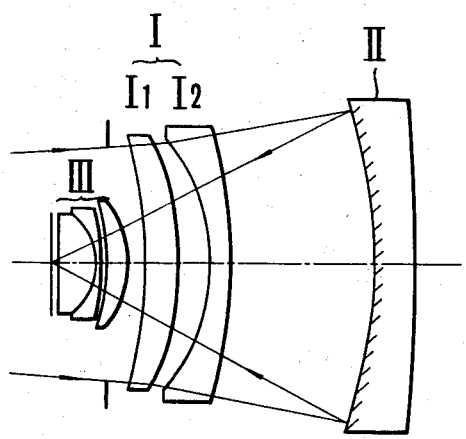
FIG. 1 is a lens block diagram of a prior art catoptric objective lens system.

An improvement of the structure of the invention over the prior art with respect to aberration correction will be better understood by comparison with that shown in FIG. 1. As the axial separation of the negative meniscus lens element $I_2$ from the positive meniscus lens element $I_1$ increases, the state of correction of coma, which is effected by suitable design of element $I_1$, is correspondingly improved with decrease in that portion of the coma correction which is cancelled out in element $I_2$. From this point of view, the structure of the invention shown in FIG. 2 may be considered as resulting from the acceptable limiting separation between elements $I_1$ and $I_2$ to such an extent that element $I_2$ combines with the mirror II in FIG. 1 On this basis, the convergent lens 1 in FIG. 2 corresponds to the element $I_1$ in FIG. 1. Such a variation of the lens arrangement is possible because the position of the lens component which contributes a main refractive power to the complete system relative to the mirror does not so much affect the correction of spherical aberrations. As a result, the state of correction of the outward coma in the system of the invention is remarkably improved. Another advantage deriving from such separation between elements $I_1$ and $I_2$ is that the diameter of mirror II may be decreased due to the converging power of the element $I_1$.

Figure 3:
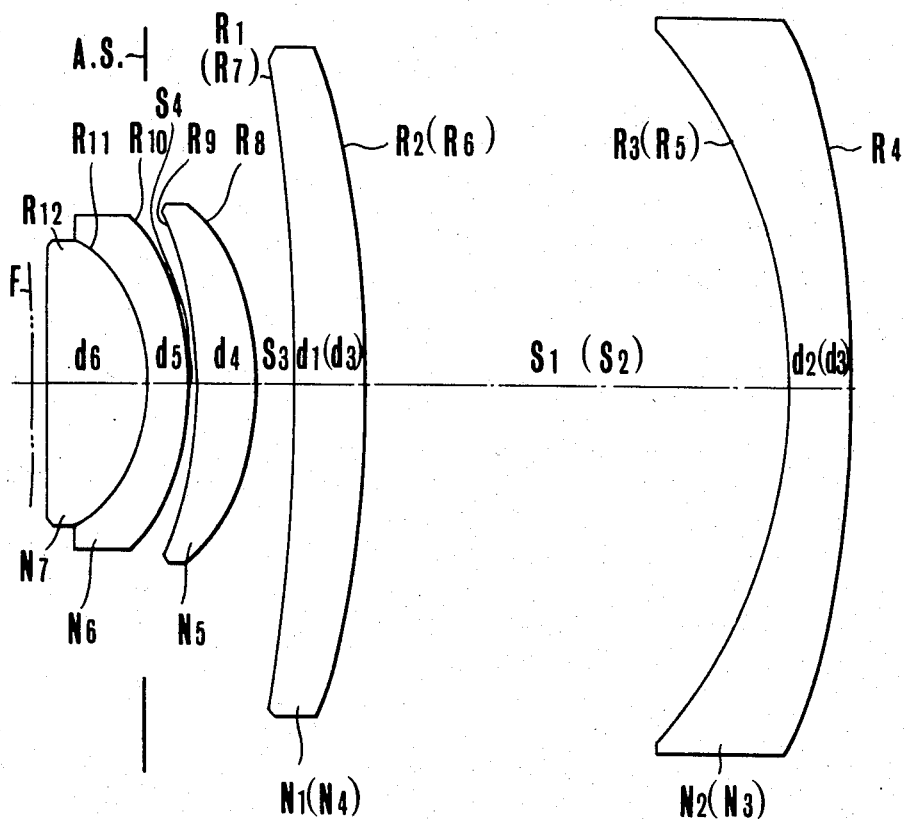
FIG. 3 is a lens block diagram of a specific example of the system constructed in accordance with the numerical data described in Table 1.

For the purpose of providing specific examples of a catoptric objective lens system as described and illustrated herein, and with reference to the lens system shown in FIG. 3, the following tabulations set forth numerical data for the radii of curvature, $R_1$ to $R_{12}$, of the lens elements numbered in the direction of light rays entering through the system from the side of the longer conjugate to the side of shorter conjugate, the axial thicknesses, $d_1$ to $d_6$, of the respective elements, the axial separations, $S_1$ to $S_7$, between the successive air spaced elements along with the corresponding refractive indices, $N_1$ to $N_7$, for the spectral D line of sodium and the Abbe numbers $V_1$ to $V_7$ for the respective lens elements.

Example I $f = 100$ Relative aperture ratio = 1 : 0.57
$F_1 = 3.69f$ Magnification of image = 1 : 4.56
$F_2 = 1.28f$
$F_3 = 0.72f$
$R_1 = -501.9$
  $d_1 = 13.3$ $N_1 = 1.62004$ $V_1 = 36.3$
$R_2 = -163.4$
  $S_1 = 60.2$
$R_3 = -88.6$
  $d_2 = 10.7$ $N_2 = 1.51633$ $V_2 = 64.1$
$R_4 = -176.3$
  $d_2 = 10.7$ $N_3 = 1.51633$ $V_3 = 64.1$
$R_5 = -88.6$
  $S_2 = 60.2$
$R_6 = -163.4$
  $d_3 = 13.3$ $N_4 = 1.62004$ $V_4 = 36.3$
$R_7 = -501.9$
  $S_3 = 16.1$
$R_8 = -52.3$
  $d_4 = 10.5$ $N_5 = 1.51633$ $V_5 = 64.1$
$R_9 = -112.3$
  $S_4 = 1.3$
$R_{10} = -52.2$
  $d_5 = 7.8$ $N_6 = 1.78472$ $V_6 = 25.7$
$R_{11} = -30.1$
  $d_6 = 22.3$ $N_7 = 1.51633$ $V_7 = 64.1$
$R_{12} = \infty$ Dimensions of lens elements

| Element | Thickness | Clear aperture | Remark |
|---|---|---|---|
| I | $d_1$ (or $d_3$) | 116 φ | Component 1 in FIG. 2 |
| II | $d_2$ (or $d_3$) | 122 φ | Mangin mirror |
| III | $d_4$ | 57 φ | |
| IV | $d_5$ | 54 φ | Component 3 |
| V | $d_6$ | 47 φ | |

It is to be understood from FIG. 4 that the system constructed in accordance with the numerical data of Example 1 is well corrected for various aberrations.

Example II $f = 214.1$ Relative aperture ratio = 1 : 0.57
$F_1 = 3.71f$ Magnification of image = 1 : 4.67
$F_2 = 1.54f$
$F_3 = 0.83f$
$R_1 = -840.3$
  $d_1 = 27.0$ $N_1 = 1.62004$ $V_1 = 36.3$
$R_2 = -313.3$
  $S_1 = 143.1$
$R_3 = -180.1$
  $d_2 = 21.0$ $N_2 = 1.51633$ $V_2 = 64.1$
$R_4 = -341.0$
  $d_2 = 21.0$ $N_3 = 1.51633$ $V_3 = 64.1$
$R_5 = -180.1$
  $S_2 = 143.1$
$R_6 = -313.3$
  $d_3 = 27.0$ $N_4 = 1.62004$ $V_4 = 36.3$
$R_7 = -840.3$
  $S_3 = 10.9$
$R_8 = -90.0$
  $d_4 = 20.6$ $N_5 = 1.51633$ $V_5 = 64.1$
$R_9 = -149.2$
  $S_4 = 2.6$
$R_{10} = -93.6$
  $d_5 = 12.0$ $N_6 = 1.71736$ $V_6 = 29.5$
$R_{11} = -56.0$
  $d_6 = 36.0$ $N_7 = 1.51633$ $V_7 = 64.1$
$R_{12} = \infty$

What is claimed is:

1. A high aperture catoptric system consisting of three serially arranged coaxially and axially spaced components including, in the direction of light rays entering the system from the side of the longer conjugate toward the side of the shorter conjugate, a convergent lens, reflecting means in the form of a negative meniscus lens having surfaces of different curvature with the rear flatter surface being mirrored and with the front concave refracting surface facing in the directions of both the longer and the shorter conjugates, and a field flattener lens of positive power located on the side
    of said convergent lens opposite to said negative meniscus lens; said catoptric system working with photodetecting means positioned adjacent said field flattener lens on the side of the shorter conjugate; said convergent lens including at least one positive meniscus lens having a concave surface facing in the direction toward the object being photographed and said field flattener lens.

2. A catoptric system according to claim 1, in which said field flattener lens is composed of a positive meniscus lens and a cemented lens constituted by a negative meniscus lens and a plano-convex lens.

3. A catoptric system according to claim 2, in which the respective lens elements, numbered in the direction of light rays entering through the system from the side of the longer conjugate to the side of the shorter conjugate, have radii or curvature R, axial thicknesses d, axial separations S, refractive indices N for the spectral D line of sodium, and Abbe numbers V as follows:

$f = 100$ Relative aperture ratio = 1 : 0.57
$F_1 = 3.69f$ Magnification of image = 1 : 4.56
$F_2 = 1.28f$
$F_3 = 0.72f$
$R_1 = -501.9$
  $d_1 = 13.3$ $N_1 = 1.62004$ $V_1 = 36.3$
$R_2 = -163.4$
  $S_1 = 60.2$
$R_3 = -88.6$
  $d_2 = 10.7$ $N_2 = 1.51633$ $V_2 = 64.1$
$R_4 = -176.3$
  $d_2 = 10.7$ $N_3 = 1.51633$ $V_3 = 64.1$
$R_5 = -88.6$ -continued

| | | |
|---|---|---|
| $S_2 = 60.2$ | | |
| $R_5 = -163.4$ | | |
| $d_3 = 13.3$ | $N_4 = 1.62004$ | $V_4 = 36.3$ |
| $R_7 = -501.9$ | | |
| $S_3 = 16.1$ | | |
| $R_8 = -52.3$ | | |
| $d_4 = 10.5$ | $N_5 = 1.51633$ | $V_5 = 64.1$ |
| $R_9 = -112.3$ | | |
| $S_4 = 1.3$ | | |
| $R_{10} = -52.2$ | | |
| $d_5 = 7.8$ | $N_6 = 1.78472$ | $V_6 = 25.7$ |
| $R_{11} = -30.1$ | | |
| $d_6 = 22.3$ | $N_7 = 1.51633$ | $V_7 = 64.1$ |
| $R_{12} = \infty$ | | |

4. A catoptric system according to claim 2, in which the respective lens elements, numbered in the direction of light rays entering through the system from the side of the longer conjugate to the side of the shorter conjugate, have radii of curvature R, axial thicknesses $d$, axial separations S, refractive indices N for the spectral D line of sodium, and Abbe numbers V as follows:

| | | |
|---|---|---|
| $f = 214.1$ | Relative aperture ratio = 1 : 0.57 | |
| $F_1 = 3.71f$ | Magnification of image = 1 : 4.67 | |
| $F_2 = 1.54f$ | | |
| $F_3 = 0.83f$ | | |
| $R_1 = -840.3$ | | |
| $d_1 = 27.0$ | $N_1 = 1.62004$ | $V_1 = 36.3$ |
| $R_2 = -313.3$ | | |
| $S_1 = 143.1$ | | |
| $R_3 = -180.1$ | | |
| $d_2 = 21.0$ | $N_2 = 1.51633$ | $V_2 = 64.1$ |
| $R_4 = -341.0$ | | |
| $d_3 = 21.0$ | $N_3 = 1.51633$ | $V_3 = 64.1$ |
| $R_5 = -180.1$ | | |
| $S_2 = 143.1$ | | |
| $R_6 = -313.3$ | | |
| $d_3 = 27.0$ | $N_4 = 1.62004$ | $V_4 = 36.3$ |
| $R_7 = -840.3$ | | |
| $S_3 = 10.9$ | | |
| $R_8 = -90.0$ | | |
| $d_4 = 20.6$ | $N_5 = 1.51633$ | $V_5 = 64.1$ |
| $R_9 = -149.2$ | | |
| $S_4 = 2.6$ | | |
| $R_{10} = -93.6$ | | |
| $d_5 = 12.0$ | $N_6 = 1.71736$ | $V_6 = 29.5$ |
| $R_{11} = -56.0$ | | |
| $d_6 = 36.0$ | $N_7 = 1.51633$ | $V_7 = 64.1$ |
| $R_{12} = \infty$ | | |

* * * * *